(12) United States Patent
Sako

(10) Patent No.: US 11,985,456 B1
(45) Date of Patent: May 14, 2024

(54) OPTOELECTRONIC SYSTEMS AND METHODS FOR INSPECTION OF OPTICALLY ENCODED DATA

(71) Applicant: Bradley T Sako, Livermore, CA (US)

(72) Inventor: Bradley T Sako, Livermore, CA (US)

( * ) Notice: Subject to any disclaimer, the term of this patent is extended or adjusted under 35 U.S.C. 154(b) by 0 days.

(21) Appl. No.: 18/205,645

(22) Filed: Jun. 5, 2023

Related U.S. Application Data

(63) Continuation of application No. 17/392,196, filed on Aug. 2, 2021, now Pat. No. 11,671,732, which is a continuation of application No. PCT/US2021/026064, filed on Apr. 6, 2021, and a continuation-in-part of application No. 16/842,740, filed on Apr. 7, 2020, now Pat. No. 11,082,132.

(51) Int. Cl.
| | |
|---|---|
| *H04Q 11/00* | (2006.01) |
| *G02B 6/27* | (2006.01) |
| *H04B 10/516* | (2013.01) |
| *H04J 14/02* | (2006.01) |

(52) U.S. Cl.
CPC ....... *H04Q 11/0062* (2013.01); *G02B 6/2773* (2013.01); *H04B 10/516* (2013.01); *H04J 14/0205* (2013.01); *H04Q 2011/0081* (2013.01)

(58) Field of Classification Search
None
See application file for complete search history.

(56) References Cited

U.S. PATENT DOCUMENTS

| | | | | |
|---|---|---|---|---|
| 5,227,908 | A  * | 7/1993 | Henmi | H04L 27/04 398/201 |
| 6,483,620 | B1 * | 11/2002 | Epworth | H04B 10/2569 398/154 |
| 6,850,713 | B2 * | 2/2005 | Kikuchi | H04B 10/506 359/239 |
| 11,082,132 | B1 | 8/2021 | Sako | |
| 11,671,732 | B2 | 6/2023 | Sako | |
| 2004/0155252 | A1 * | 8/2004 | Yap | G02F 1/011 257/82 |
| 2004/0202480 | A1 * | 10/2004 | Weid | H04B 10/2569 398/147 |
| 2008/0232823 | A1 * | 9/2008 | Jansen | H04B 10/58 398/204 |
| 2010/0021166 | A1 * | 1/2010 | Way | H04J 14/0256 398/79 |
| 2011/0013907 | A1 * | 1/2011 | Sugihara | G02F 1/0123 398/38 |
| 2015/0086215 | A1 * | 3/2015 | Chen | H04L 5/0046 398/136 |

(Continued)

*Primary Examiner* — Darren E Wolf

(57) ABSTRACT

A system can include a splitter configured to receive a first optical signal carrying first data and generate a first optical signal copy and second optical signal copy. Also included is at least one optical processing path includes at least one optical encoder configured to transform the first optical signal copy into a second optical signal carrying the first data and an additional optical feature not present in the first optical signal, at least one optical modulator configured to optically modulate the second optical signal according to a compare data to generate an optical match signal that indicates matches between the compare data and the first data, and at least one photodetector configured to generate an electrical match signal in response to the optical match signal. Corresponding methods are also disclosed.

19 Claims, 10 Drawing Sheets

(56) References Cited

U.S. PATENT DOCUMENTS

| | | | |
|---|---|---|---|
| 2016/0282699 A1* | 9/2016 | Gottwald | H04B 10/50577 |
| 2017/0250758 A1* | 8/2017 | Kikuchi | H04B 10/2507 |
| 2017/0264368 A1* | 9/2017 | Eiselt | H04B 10/2507 |
| 2019/0229808 A1* | 7/2019 | Calhoun | H01Q 21/0006 |

* cited by examiner

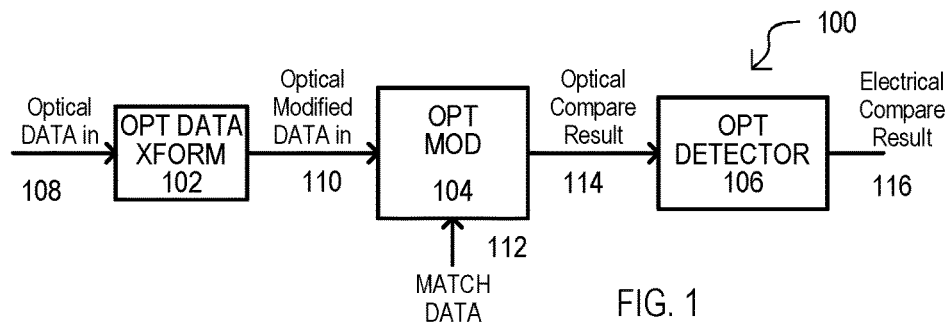
FIG. 1
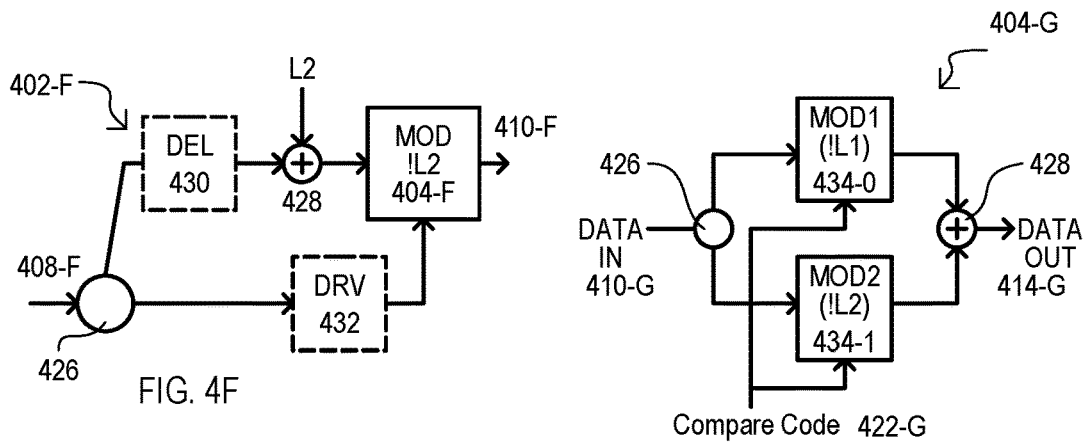
FIG. 2
RES1 != RES0, RES3
RES2 != RES0, RES3
RES1, RES2 = NO MATCH
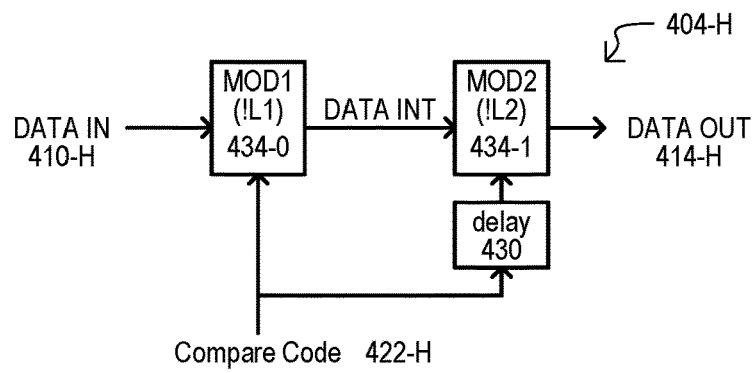
FIG. 4F
FIG. 4G
FIG. 4H

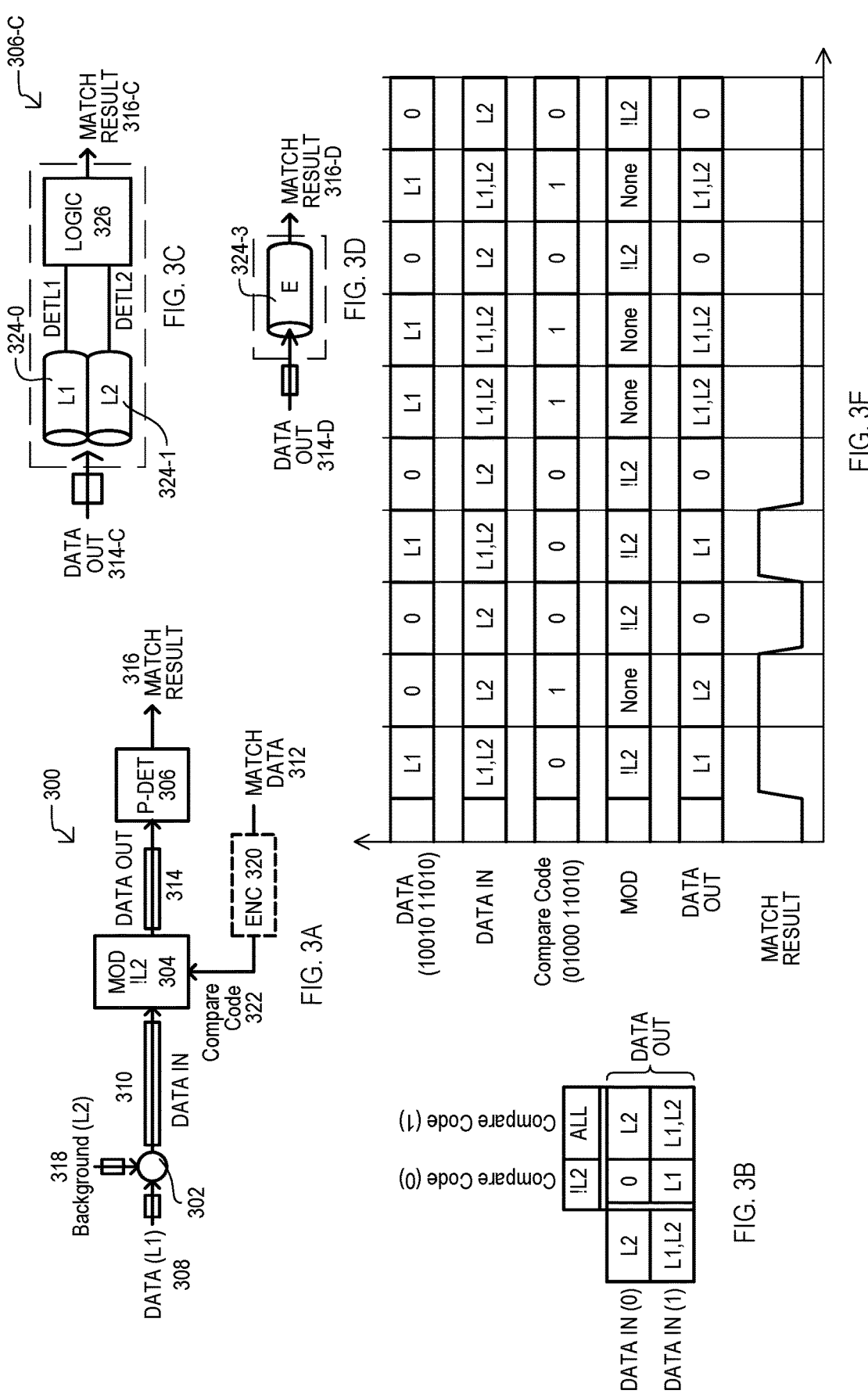

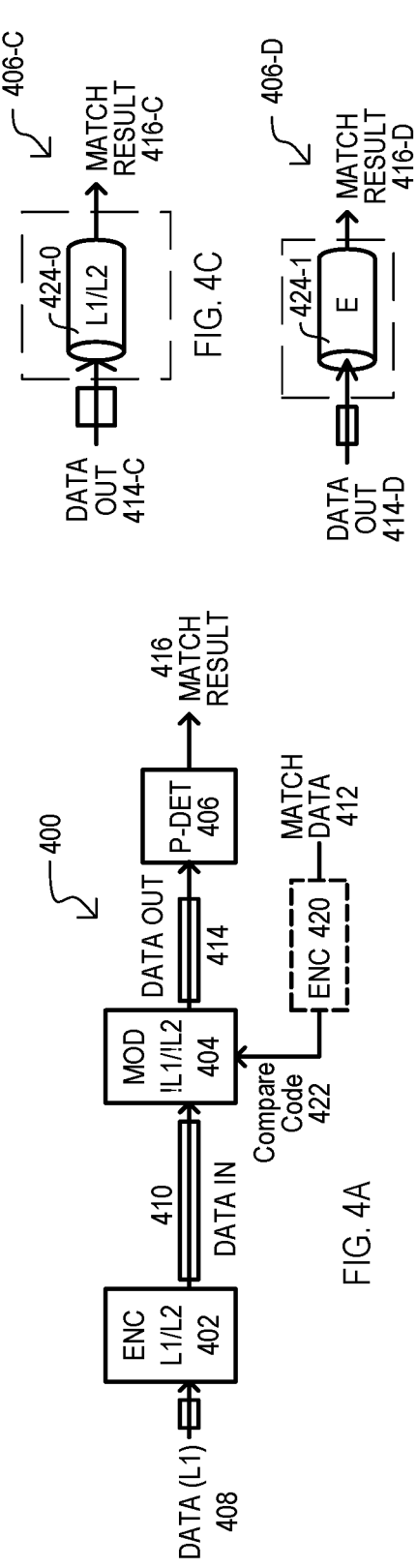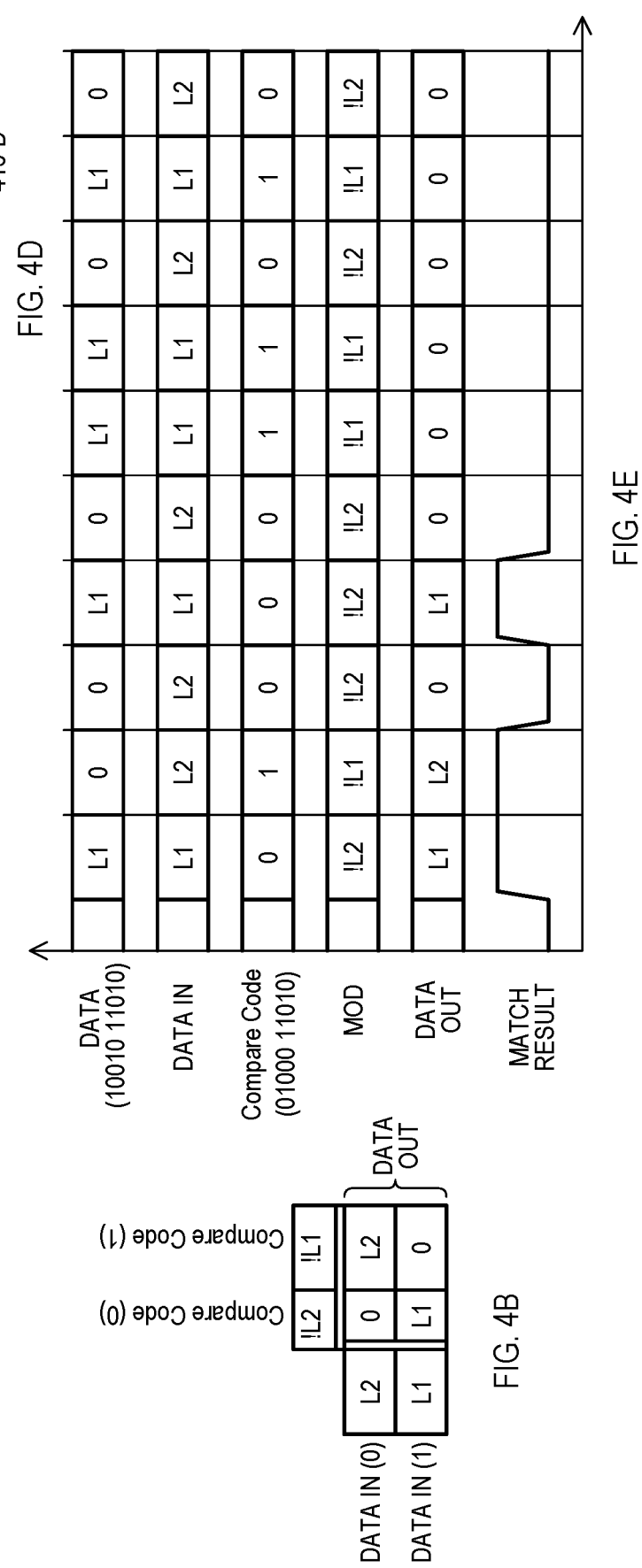

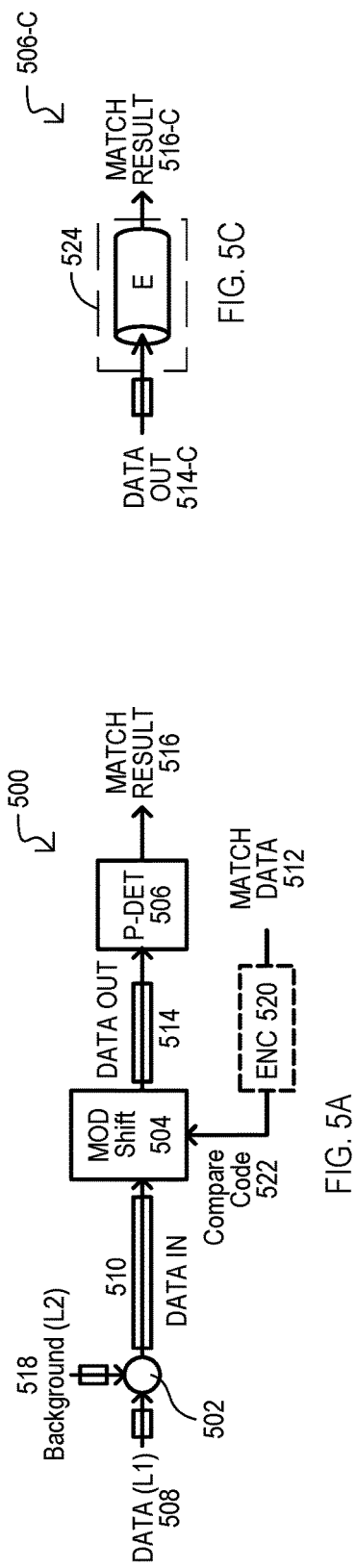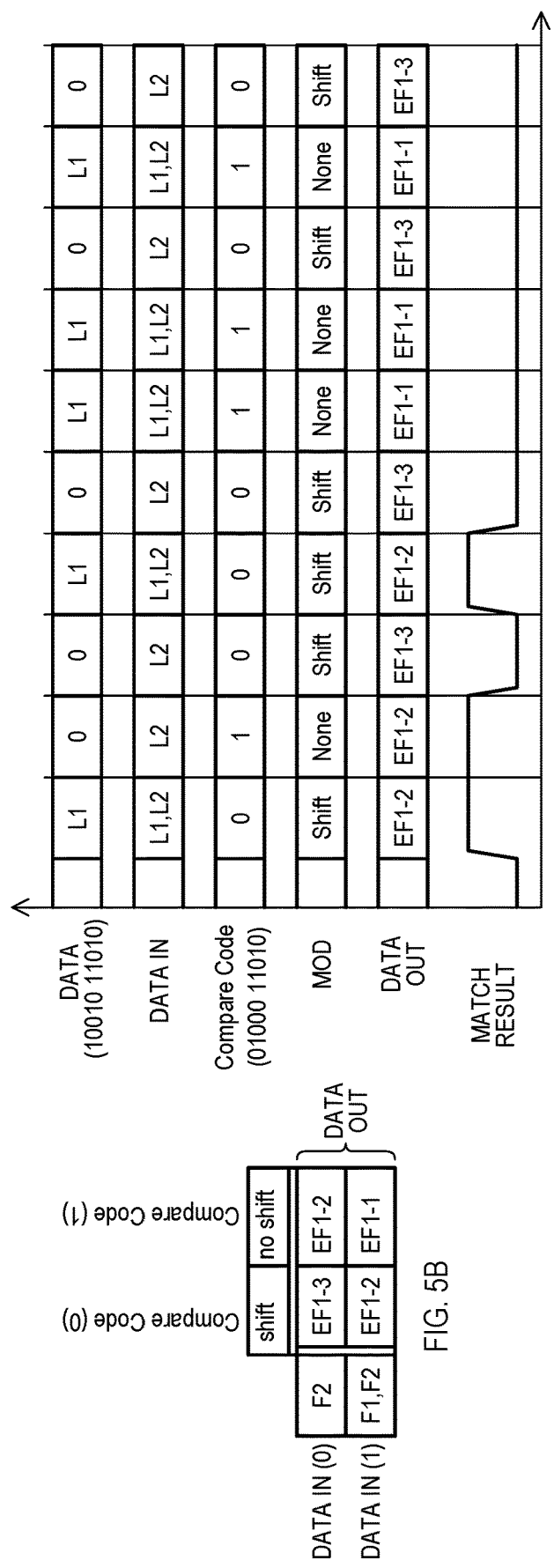

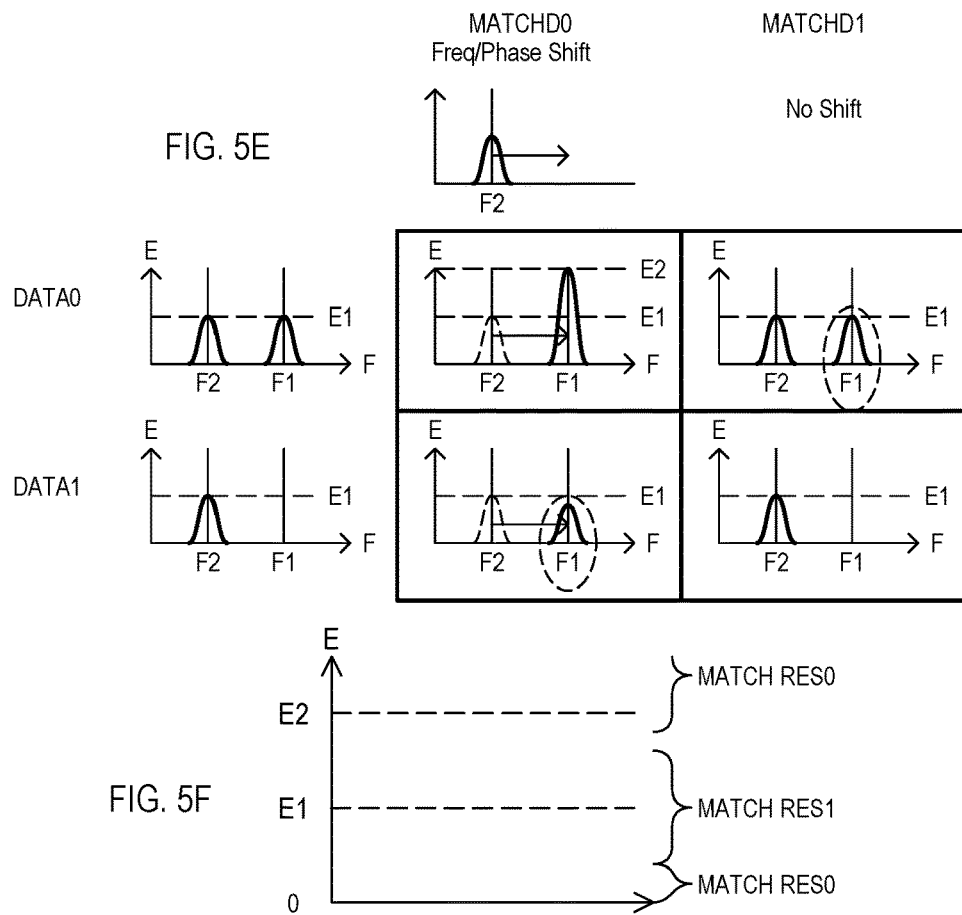
FIG. 5E
FIG. 5F
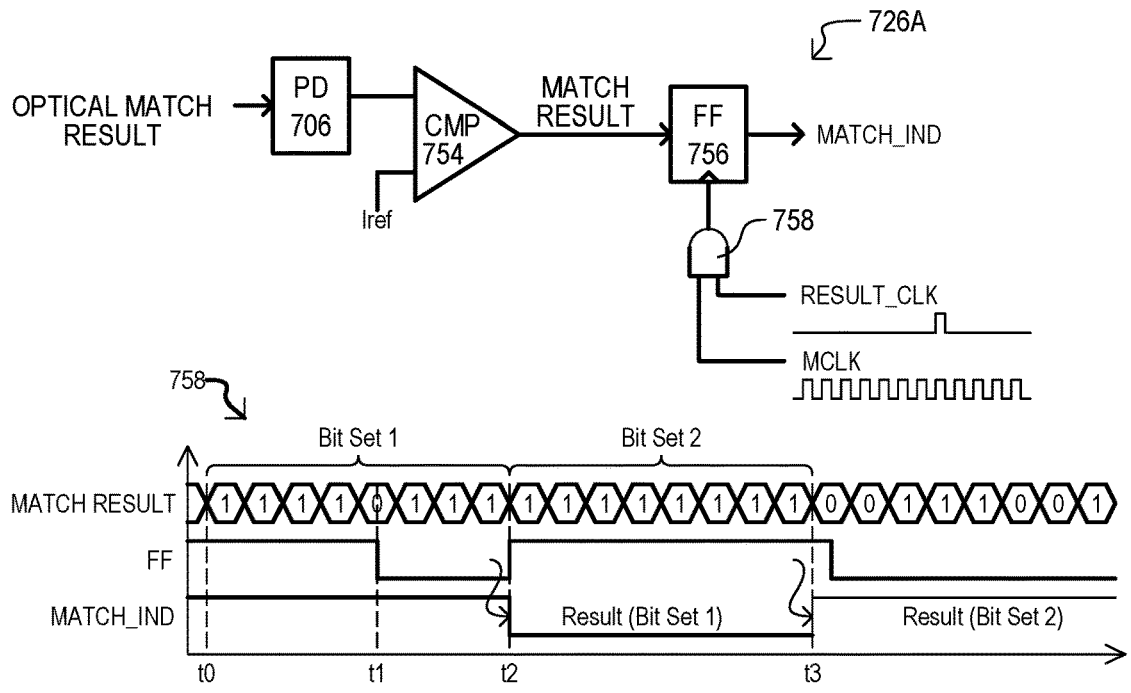
FIG. 7A

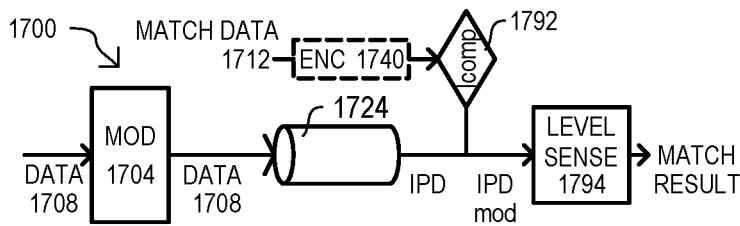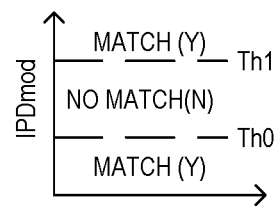
FIG. 17A
FIG. 17B
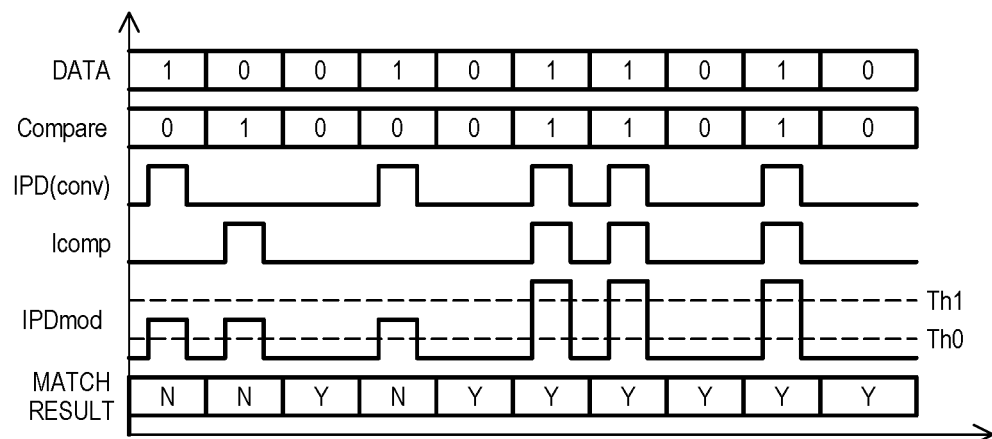
FIG. 17C
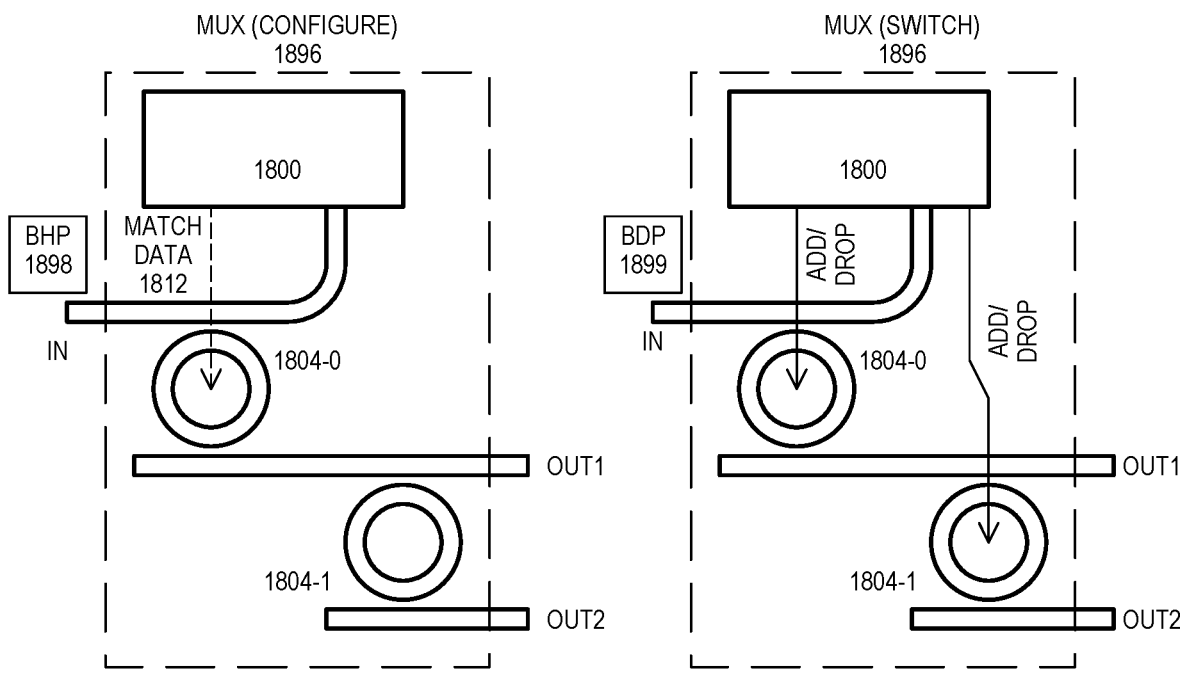
FIG. 18A
FIG. 18B

US 11,985,456 B1

OPTOELECTRONIC SYSTEMS AND METHODS FOR INSPECTION OF OPTICALLY ENCODED DATA

RELATED APPLICATIONS

This application is a continuation of U.S. patent application Ser. No. 17/392,196, filed on Aug. 2, 2021, which is a continuation of PCT application PCT/US21/26064, filed Apr. 6, 2021, and a continuation-in-part of U.S. patent application Ser. No. 16/842,740, filed on Apr. 7, 2020, and issued as U.S. Pat. No. 11,082,132, on Aug. 3, 2021, the contents all of which are incorporated by reference herein.

TECHNICAL FIELD

The present disclosure relates generally to optoelectronic systems, and more particularly to systems for inspecting data encoded in an optical data stream.

BACKGROUND

Electronic systems can transmit or receive data in various forms. Most commonly, data can be transmitted as an electrical signal over an electrically conductive material (e.g., wire). However, in other systems all or a portion of a data path can include transmitting data in optical form through an optical path (e.g., waveguide).

In some systems, data can be transmitted as serial data in a packet format. A packet can include various sections, including any of: a preamble, header, and payload. In order to process such packets, it is desirable to determine the data contained in all or a portion of a header or payload (i.e., inspect the packet). Conventionally, such packet inspection involves converting the optical signals into electrical signals, and then storing (buffering) the packet data in memory circuits. The stored packet data can then be examined using circuits, such as search engines including those having content addressable memories (CAMs).

BRIEF DESCRIPTION OF THE DRAWINGS

FIG. 1 is a block diagram of a system according to an embodiment.

FIG. 2 is a table showing an optical modulation operation according to an embodiment.

FIGS. 3A to 3E are diagrams showing a system and operations of the system according to an embodiment.

FIGS. 4A to 4H are diagrams showing a system and operations according to another embodiment.

FIGS. 5A to 5F are diagrams showing a system and operations according to another embodiment.

FIGS. 7A to 7C are diagrams of match result circuits according to embodiments.

FIGS. 17A to 17C are diagrams of a system according to another embodiment.

FIGS. 18A and 18B are diagrams showing an optical multiplexer and operations according to embodiments.

DETAILED DESCRIPTION

Figure 6B:
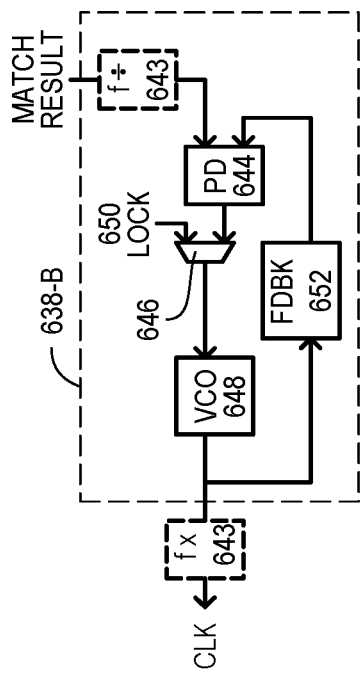
FIGS. 6A to 6C are diagrams showing a system and operations according to another embodiment.

According to embodiments, a system can include an optical encoder section that can encode a first optical signal carrying first data into a second optical signal. An optical modulator can modulate the second optical signal based on compare data to generate an optical match signal. A photodetector can generate an electrical match signal in response to the optical match signal. The optical match signal can have first values when the first data matches the compare data, and second values when the first data does not match the compare data. In some embodiments, the electrical match signal can provide an indication that the first data carried in the first optical data signal matches the compare data. In some embodiments, the optical modulator and photodetector can be formed on the same substrate of an integrated circuit (IC) device. In particular embodiments an optical modulator can be a microring resonator. In some embodiments, an IC device can include pairs of optical modulators and photodetectors arranged into processing channels. Each processing channel can compare the second optical signal to different compare data signals.

FIG. 1 is a block diagram of a system 100 according to an embodiment. A system 100 can include an optical encoder 102, optical modulator 104, and an optical signal detector 106. An optical encoder 102 can receive a first optical signal 108 and generate a second optical signal 110. A first optical signal 108 can carry first data. Second optical signal 110 can carry the same first data, but encoded in a different form. In some embodiments, a second optical signal 110 can include the addition of an optical signal to the first optical signal 108. That is, the first optical signal 108 is included in the second optical signal 110.

In some embodiments, a second optical signal 110 can be created by adding a background signal to the first optical signal that does not vary in response to the first data. However, in other embodiments, a second optical signal 110 can include other types of encoding.

In some embodiments, a first optical signal 108 can include one or more serial data streams carrying the first data. Such serial data streams can be encoded for transmission over a medium (e.g., fiber optic medium) or may be decoded into a predetermined format. Similarly, such data streams can be demultiplexed from a medium carrying multiplexed signals. Still further, such data streams can be encrypted or decrypted.

An optical modulator 104 can modulate a second optical signal 110 according to compare data 112 to generate an optical match result 114. An optical match result 114 can be used to detect predetermined patterns in first optical signal 110. In particular embodiments, an optical modulator 104 can selectively induce one or more effects on the second optical signal according to compare data 112. Such an effect can be according to any suitable modulation, including but not limited to: selective interference, selective polarization, selective occlusion, selective reflection, selective refraction, and selective absorption.

In some embodiments, an optical match result 114 can be used to determine if first data are, or include, predetermined values. Accordingly, in particular embodiments, compare data 112 can be varied as the first data varies. That is, if the first data are encoded, encrypted or otherwise altered to generate the first optical signal 108, compare data 112 can be likewise encoded, encrypted or altered in the same fashion. In particular embodiments, optical modulator 104 can receive a second optical signal 110 as a serial variation in light and can alter such a serial stream of light data in response to compare data 112 received in serial form.

An optical modulator 104 can take any suitable form according to the optical signals being used, including but not limited to a microring resonator or an optically controlled waveguide switch.

An optical signal detector 106 can receive the optical match result 114 from optical modulator 104 and can generate an electrical match result 116. In particular embodiments, electrical match result 116 can be used by other parts of a system to signal when incoming optical data has predetermined patterns. An optical signal detector 106 can distinguish any of various optical signal states to derive match information from optical match result 114. As but a few of many possible examples, an optical signal detector 106 can sense variations in any of: light intensity, phase, frequency or polarization. An optical signal detector 106 can take any suitable form according to the optical signals being used, including but not limited to a photoconductor, junction photodetector, or photodiode.

FIG. 2 is a table showing the operation of an optical modulator according to an embodiment. Values LIN0 and LIN1 represent different optical states of a second optical signal. MOD0 represents how the second optical signal is modulated in response to one compare data value (e.g., 0), and MOD1 represents how the second optical signal is modulated in response to a second compare data value (e.g., 1). Modulation results are shown as RES0, RES1, RES2 and RES3, and can represent states of an optical match result. It is noted that such states are not necessarily different from one another. However, as shown in the figure, state RES1 is not equal to states RES0 or RES3, and state RES2 is not equal to states RES0 or RES3. In addition, in some embodiments, states RES1 and RES2, which may or may not be different, can indicate a NO MATCH state.

In particular embodiments, modulation performed by optical modulator 104 can be conceptualized as determining, or enabling the determination of (with optical e.g., signal detector 106) an exclusive-OR or exclusive-NOR operation between first data carried by first optical signal 108 and compare data 112.

FIGS. 3A to 3E are diagrams showing systems 300 according to particular embodiments. A system 300 can include items like those shown in FIG. 1, and such like items are referred to by the same reference character, but with the leading digit being a "3" instead of a "1". In particular embodiments, a system 300 can be one implementation of that shown in FIG. 1. In the embodiment shown, an optical encoder 302 can include an optical combiner which can combine a background signal (which includes an optical signal feature L2) 318 with a first optical signal (which includes optical signal feature L1) 308 to create second optical signal 310, as an input signal to optical modulator 304. In a particular embodiment, a background signal (L2) can be an optical signal having features that are constant over time (i.e., constant frequency, phase, intensity, polarization, etc.). A first optical signal (L1) can vary over time (e.g., be modulated with data). For example, the presence or absence or difference in frequency, phase, intensity, polarization, etc., can indicate different data values.

Optical modulator 304 can modulate second optical signal 304 according to a received compare code 322. A compare code 322 can be, or include, compare data 312. In a particular embodiment, optical modulator 304 can selectively pass or reduce (e.g., filter) one or more particular features of second optical signal 310 based on compare code 322. Such modulations can take any suitable form according to the way in which data is encoded into second optical signal 310. Accordingly, optical modulator 304 can modulate based on, but not limited to, any of: selectively interfering with one or more wavelengths/spectrums, selectively polarizing one or more wavelengths/spectrums, selectively occluding one or more wavelengths/spectrums, selectively absorbing one or more wavelengths/spectrums, selectively refracting one or more wavelengths/spectrums, or selectively reflecting one or more wavelengths/spectrums. An optical modulator 304 can take any suitable form based on how data is encoded into second optical signal. Accordingly, optical modulator 304 can include, but is not limited to, any of: a microring resonator, or optical switch controllable by compare data 312.

In particular embodiments, an optical modulator 304 can modulate to provide a match result based on a comparison between data carried by first optical signal 308 and compare data 312. That is, optical modulator 304 can generate a predetermined modulator output signal 314 that can indicate when compare data 312 does or does not match the data carried by first optical signal 308.

In some embodiments, compare data 312 can be encoded to match an encoding of data within second or first optical signals (308, 310). Accordingly, a system 300 can include an encoder 320, which can encode compare data 312 to generate a compare code 322. As but one of many possible examples, encoder 320 can encode data value of n-bits into data values of m-bits, where m>n.

While an optical modulator 304 can receive a second optical signal 310 as an input, the modulating data (e.g., compare data 312 or compare code 322) can be an electrical or optical signal depending upon the particular type of optical modulator 304.

Optical signal detector 306 can generate a match result 316 value based on a modulator output signal 314. Optical detector 306 can detect values provided by modulator output signal 314 in any suitable form, according to the way in which data is encoded into modulator output signal 314. Accordingly, optical signal detector 306 can detect predetermined features of an optical signal, including but not limited to: optical signal intensity, optical signal phase and/or frequency, and optical signal polarization. An optical signal detector 306 can take any suitable form based on the type of modulator output signal 314 received. Accordingly, optical signal detector 306 can include, but is not limited to, any of: a photoconductor device and a photodetector device, including a junction photodetector or photodiode. Optical signal detector 306 can provide an electrical match result 316. In particular embodiments, electrical match result 316 can be an electrical signal indicating a match or no match result between compare data 312 and data included within first optical signal 308. Such a comparison result can include a signal corresponding to each of a number of single bit comparisons and/or a result having a single value corresponding to multi-bit comparisons. In particular embodiments, an optical signal detector 306 can include a buffer to store match results.

FIG. 3B is a table showing a modulation operation that can be included in the embodiment of FIG. 3A. As shown, a second optical signal can be encoded into two possible data values (e.g., 0 and 1). One data value is formed by the transmission of a second optical signal characteristic (L2) (and not a first optical signal characteristic, L1), the other data value is formed by the transmission of both the first and second optical signal characteristics (L1,L2).

An optical modulator (e.g., 304) can encode in the following fashion: if a compare code has a first value, optical modulator 304 can prevent or diminish L2 (represented as !L2); and if a compare code has a second value, optical modulator 304 can allow, or not substantially effect, L2. Thus, if a compare code matches a data value in second optical signal 310, a modulator output signal 314 can be "0" (i.e., neither L1 or L2 are present or do not exceed some minimum limit), or L1/L2 (i.e., both L1 and L2 are present or exceed some minimum limit). If a compare code does not match a data value in second optical signal 310, a modulator output signal 314 can be L1 (i.e., L1 is present or exceeds some minimum limit and L2 is not present or does not exceed some minimum limit) or L2 (i.e., L2 is present or exceeds some minimum limit and L1 is not present or does not exceed some minimum limit). Of course, match results can be the opposite (with 0 or L1/L2 indicating a match and L1 or L2 indicating no match). Optical signal characteristics (i.e., L1, L2) can be any suitable features of light, including but not limited to: wavelength/frequency, polarization, relative phase, and relative intensity.

FIG. 3C is a diagram of an optical signal detector 306-C that can be included in an embodiment like that shown in FIG. 3B. Optical signal detector 306-C can include first detect section 324-0, second detect section 324-1 and logic 326. First detect section 324-0 can detect a first optical signal characteristic L1, while second detect section 324-1 can detect a second optical signal characteristic L2. It is understood that first and second detect sections 324-0/1 can be separate from one another, or parts of an integrated detector. In particular embodiments, first and second detect sections 324-0/1 can provide output signals DETL1, DETL2, that vary according to the presence of the corresponding optical signal characteristic. Logic 326 can receive signals DETL1, DETL2 and generate an electrical match output signal. In one very particular embodiment, logic 306 can operate as shown in FIG. 3B, generating a match result 316-C having one value when only one of L1/L2 are detected, and generating another match result 316-C value when neither L1 or L2 is detected or both L1 and L2 are detected. As noted above, while in some embodiments MATCH RESULT can vary on a bit by bit basis, in other embodiments it can vary on a multi-bit basis (e.g., representing the matching or non-matching of multiple bits).

FIG. 3D is a diagram of another optical signal detector 306-D that can be used in an embodiment like that shown in FIG. 3B. Optical signal detector 306-D can include detect section 324-3 that can sense an overall energy or intensity of an encoder output signal 314-D. In particular embodiments, if an overall intensity is below or above a predetermined range (e.g., 0 or L1/L2), match result 316-D can have one value, and if an overall intensity is within a predetermined range (e.g., L1 or L2), match result 316-D can have another value. As noted above, while in some embodiments MATCH RESULT can vary on a bit by bit basis, in other embodiments it can vary on a multi-bit basis.

FIG. 3E is a timing diagram showing an encoding operation like that of FIG. 3B in a system like that of FIG. 3A, according to one embodiment. FIG. 3E includes the following waveforms: DATA can be data encoded in a first optical signal by the presence or absence of optical signal feature L1. DATA IN can be a second optical signal received by an optical modulator (e.g., 304). DATA IN can be generated in an optical encoder (e.g., 302) by simply adding second optical signal feature L2. Compare Code can be a modulating input received by optical modulator. MOD shows the particular modulation executed by the optical modulator. As shown, if Compare Code has one value (0 in this case), optical modulator can reduce or eliminate L2 (represented by !L2) from DATA IN. If Compare Code has another value (1 in this case), optical modulator can essentially not affect DATA IN. DATA OUT shows an optical output from optical modulator following the noted modulation scheme. MATCH RESULT shows an output signal generated by an optical signal detector (e.g., 306) in response to an output from optical modulator.

As shown, when a Compare Code does not match DATA, MATCH RESULT has one value (in this case high), and when Compare Code matches DATA, MATCH RESULT has another value (in this case low).

FIGS. 4A to 4H are diagrams showing systems 400 according to additional embodiments. A system 400 can include items like those shown in FIG. 3, and such like items are referred to by the same reference character, but with the leading digit being a "4" instead of a "3". In particular embodiments, a system 400 can be one implementation of that shown in FIG. 1.

In the embodiment shown, an optical encoder 402 can differ from that of FIG. 4 in that it can create a second optical signal 410 that adds a second optical signal feature (L2) where there is an absence of a first optical feature (L1) in first optical signal 408. Thus, a second optical signal 410 can have L2 (and not L1) for one data value (e.g., 0) and L1 (and not L2) for another data value (e.g., 1).

In the embodiment shown, optical modulator 404 can modulate second optical signal 404 according to a received compare code 422. In a particular embodiment, optical modulator 404 can selectively pass or reduce one of multiple optical features based on compare code 422. As shown in more detail, in particular embodiments, an optical modulator 404 can selectively reduce or effectively remove on optical signal feature (e.g., L1) when a compare code 422 has one value, and selectively reduce or effectively remove another optical signal feature (e.g., L2).

An optical modulator 404 can modulate according to any of the suitable forms described herein, and take any suitable form as described herein, or equivalents. As in the case of FIG. 3A, in some embodiments, compare data 412 can be encoded with an encoder 420 that matches the encoding of a data 408.

An optical signal detector 406 can detect match results from optical encoder 404 according to any of the suitable forms described herein, and take any suitable form as described herein, or equivalents.

FIG. 4B is a table showing a modulation operation that can be included in the embodiment of FIG. 4A. As shown, a second optical signal can be encoded into two possible data values (e.g., 0 and 1). One data value is formed by the transmission of a second optical signal characteristic (L2) (and not a first optical signal characteristic, L1), the other data value is formed by the transmission the first optical signal characteristic (L1) (and not the second first optical signal characteristic, L2). An optical modulator (e.g., 404)

can encode in the following fashion: if a compare code has a first value, optical modulator 404 can prevent or diminish L2 (!L2); and if a compare code has a second value, optical modulator 404 can prevent or diminish L1 (!L1). Thus, if a compare code matches a data value in second optical signal 410, a modulator output signal 414 can be "0" (i.e., neither L1 or L2 are present or exceed some minimum limit). If a compare code does not match a data value in second optical signal 410, a modulator output signal 414 can be L1 or L2 (i.e., L1 or L2 is present or exceeds some minimum limit). Of course, match results can be the opposite (with 0 indicating a match and L1 or L2 indicating no match). Optical signal characteristics (i.e., L1, L2) can be any suitable features as described herein, or an equivalent.

FIG. 4C is a diagram of an optical signal detector 406-C that can be used in an embodiment like that shown in FIG. 4B. Optical signal detector 406-B can include a detect section 424-0 which can detect either a first or second optical signal characteristic L1/L2.

FIG. 4D is a diagram of another optical signal detector 406-D that can be used in an embodiment like that shown in FIG. 4B. Optical signal detector 406-D can include detect section 424-2 that can sense an overall energy or intensity of an encoder output signal 414-D. In particular embodiments, if an overall intensity is above a predetermined range (e.g., L1 or L2), match result 416-D can have one value, and if an overall intensity is below a predetermined range (e.g., 0), match result 416-D can have another value. As noted above, while in some embodiments MATCH RESULT can vary on a bit by bit basis, in other embodiments it can vary on a multi-bit basis.

FIG. 4E is a timing diagram showing an encoding operation like that of FIG. 4B in a system like that of FIG. 4A, according to one very particular embodiment. FIG. 4E differs from FIG. 3E in that DATA IN can be encoded to provide either a first or second optical signal characteristic. Further, a modulation operation MOD can be as follows: if compare code has one value (0 in this case), optical modulator can reduce or eliminate L2 (represented by !L2) from DATA IN. If Compare code has another value (1 in this case), optical modulator can reduce or eliminate L1 (represented by !L1) from DATA IN. As shown, when Compare code does not match DATA, MATCH RESULT has one value (in this case high), and when Compare code matches DATA, MATCH RESULT has another value (in this case low).

FIG. 4F is a diagram showing an optical encoder 402-F that can be used in an embodiment like that of FIG. 4A. Optical encoder 402-F can receive a first optical signal 408-F which can represent data by the presence or absence of a first optical signal characteristic L1, and can output a second optical signal which can represent data by the presence of a first or second optical signal characteristic (L1 or L2). Optical encoder 402-F can include a splitter 426, optical combiner 428, and optical modulator 404-F. A splitter 426 can provide first optical signal 408-F as an input to optical combiner 428 and as a modulation control input to optical modulator 404-F. Optical combiner 428 can add L2 to first optical signal 408-F. Optical modulator 404-F can remove, or significantly reduce the presence of L2 based on first optical signal 408-F to generate second optical signal 410-F. In a particular embodiment, when first optical signal 408-F transmits L1, optical modulator 404-F can remove/reduce L2. Consequently, second optical signal 410-F can be like first optical signal 408-F, however, where first optical signal 408-F does not include L1 in optical signal 410-F, such locations can include L2 (i.e., compare DATA to DATA IN in FIG. 4E).

Optionally, optical encoder 402-F can include a converter driver 432. Converter driver 432 can convert first optical signal 408-F into electrical signals for driving the optical modulator 404-F. Further, optical encoder 402-F can optionally include an optical delay element 430 to account for any delays introduced by converter driver 432.

Referring back to FIG. 4A, while an optical modulator 404 can take any suitable form, in some embodiments, an optical modulator 404 can include separate modulation elements that selectively remove or reduce one particular optical signal characteristic.

FIG. 4G is a diagram showing an optical modulator 404-G that can be used in an embodiment like that of FIG. 4A. Optical modulator 404-G can modulate different optical signal characteristics in parallel. Optical modulator 404-G can include a splitter 426, a first modulation element 434-0, a second modulation element 434-1, and a combiner 428. A first modulation element 434-0 can selectively remove or reduce one optical signal characteristic (e.g., L1), and a second modulation element 434-1 can selectively remove or reduce a second optical signal characteristic (e.g., L2).

Splitter 426 can split a second optical signal 410-G to provide it as inputs to both first and second modulation elements 434-0/1. First and second modulation elements 434-0/1 can modulate second optical signal 426 in response to compare code 422-G. In a particular embodiment, first modulation element 434-0 can remove/reduce L1 when a compare code 422-G has one value (e.g., 1), and substantially not effect second optical signal 410-G when compare code 422-G has another value (e.g., 0). Conversely, second modulation element 434-1 can remove/reduce L2 when a compare code 422-G has the other value (e.g., 0), and substantially not effect second optical signal 410-G when compare code 422-G has the one value (e.g., 1). Combiner 428 can combine outputs of first and second modulation elements 434-0/1 to generate a modulation output signal 414-G.

FIG. 4H is a diagram showing another optical modulator 404-H that can be used in an embodiment like that of FIG. 4A. Optical modulator 404-H can modulate different optical signal characteristics in series. Optical modulator 404-H can include a first modulation element 434-0 and a second modulation element 434-1 as described for FIG. 4G. Thus, first modulation element 434-0 can selectively remove or reduce one optical signal characteristic (e.g., L1) to generate an intermediate optical signal DATA INT based on compare code. Intermediate optical signal DATA INT can be received by second modulation element 434-1 can selectively remove or reduce another optical signal characteristic (e.g., L2) to generate modulator output signal 414-H. Optionally, optical modulator 404-H can include a delay element 430 which can delay the application of compare code 422-H to second modulation element 434-1.

FIGS. 5A to 5F are diagrams showing systems 500 according to further embodiments. Referring to FIG. 5A, a system 500 can include items like those shown in FIG. 3, and such like items are referred to by the same reference character, but with the leading digit being a "5" instead of a "3". In particular embodiments, a system 500 can be one implementation of that shown in FIG. 1.

In the embodiment shown, optical modulator 504 can selectively shift a frequency or phase of light within a first optical signal 508 based on compare code 522. An optical signal detector 506 can detect match results based on the amount of energy or intensity of light received at a predetermined frequency/phase.

FIG. 5B is a table showing a modulation operation that can be included in the embodiment of FIG. 5A. As shown, a second optical signal can be encoded into to possible data values (e.g., 0 and 1). One data value is formed by the transmission of a second frequency or phase (F2) (and not a first frequency/phase). The other data value is formed by the transmission the first frequency/phase with the second frequency/phase. An optical modulator (e.g., 504) can encode in the following fashion: if a compare code has a first value, optical modulator 504 can introduce a frequency/phase shift; and if a compare code has a second value, optical modulator 504 can leave second optical signal essentially unchanged. In the particular embodiment shown, if a compare code matches a data value in second optical signal 510, a modulator output signal 514 can have one energy/intensity (EF1-2). If a compare code does not match a data value in second optical signal 510, a modulator output signal 514 can have one of two other energy/intensity levels (EF1-1, EF1-3) that are not the same as the one level (EF1-2). Of course, match results can be the opposite (i.e., one diagonal results in FIG. 5B can indicate a match condition while the other diagonal result indicates a no match condition).

FIG. 5C is a diagram of an optical signal detector 506-C that can be used in an embodiment like that shown in FIG. 5B. Optical signal detector 506-B can include a detect section 524 which can detect energy/intensity levels.

FIG. 5D is a timing diagram showing an encoding operation like that of FIG. 5B in a system like that of FIG. 5A, according to one very particular embodiment. FIG. 5D differs from FIG. 3E in that a modulation operation MOD can be as follows: if Compare code has one value (0 in this case), optical modulator can introduce a phase/frequency shift to a particular light phase/frequency, if present. If Compare code has another value (1 in this case), optical modulator can perform essentially no phase/frequency shift.

FIG. 5E is a diagram showing one particular example of a modulation operation for an embodiment like that of FIG. 5A. A second optical signal can represent one data value (DATA0) with light having two frequencies (or phases) F2 and F1, which can have predetermined energy levels (both E1 in this example). A second data value (DATA1) can be represented by only one frequency (or phase) F2, which can have the same predetermined energy levels as DATA0 (E1 in this example). An optical modulator (e.g., 504) can shift light at first frequency/phase F1 (or frequency/phase range) to a second frequency/phase F2 (or frequency/phase range). Thus, when a first match pattern value is MATCHD0, there can be a phase/frequency shift. In the case of one data value (i.e., DATA0), light of frequency F2 can be shifted to F1. Because there is already light at frequency F1, the overall energy at F1 can be higher (shown as E2). In the case of the other data value (i.e., DATA1), light of frequency F2 can be shifted to F1, but because there is no preexisting F1 component, the overall energy at F1 can remain around E1. When a first match pattern value is MATCHD1, there can be no phase/frequency shift. In the case of the one data value (i.e., DATA0), light of at F1 can have energy at about E1. In the case of the other data value (i.e., DATA1), there is no light at F1, so the overall energy at F1 can be around zero.

From the table of FIG. 5E it can be seen that when data and compare code values match, energy can be at a relatively high level (E2) or low level (zero). However, when data and match pattern values do not match, energy can be at about a relatively medium level (E1), which is between E2 and zero.

FIG. 5F is a diagram showing one particular example of an optical signal detector, like that of FIGS. 5A and/or 5B. If energy at particular phase/frequency F1 is near zero, or at or above E2, a first match result MATCH RES0 can be generated. If energy at F1 is at near E1, a second match result MATCH RES1 can be generated.

According to embodiments, modulation of a received optical signals can be synchronized according to a data rate of the received optical signal. In particular embodiments, a system can include a clock circuit that can synchronize compare code values based on a filtering operation by an optical encoder. Particular embodiments having such synchronization of data are shown in FIGS. 6A to 6C.

Figure 6A:
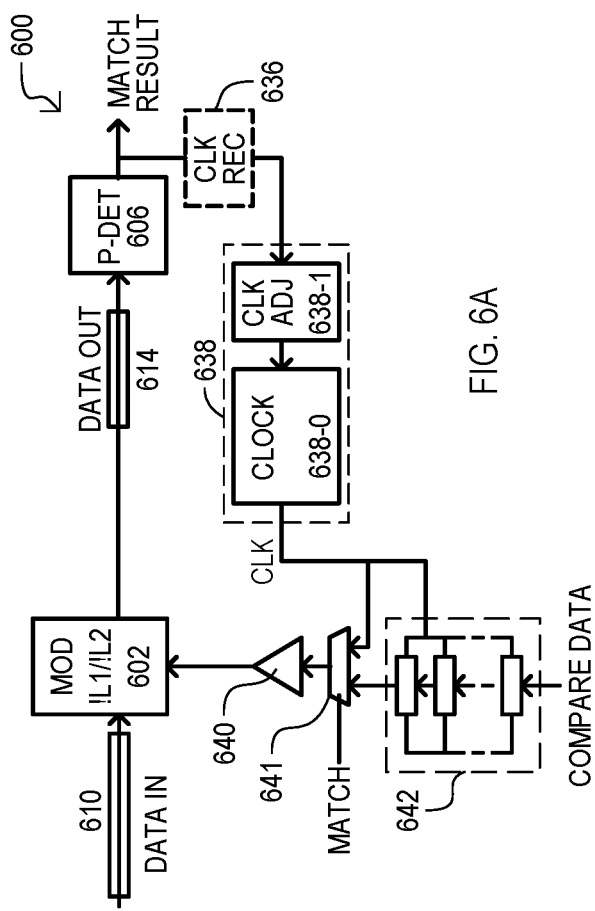
Figure 6C:
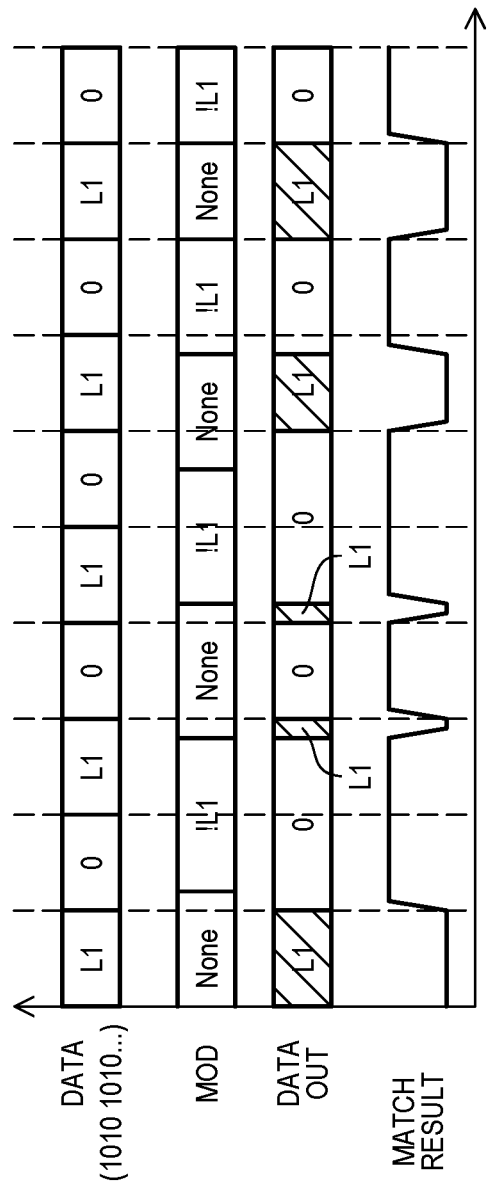

FIG. 6A shows a system 600 that can include items like those shown in FIG. 3A, and such like items are referred to by the same reference character, but with the leading digit being a "6" instead of a "3". In particular embodiments, a system 600 can be one implementation of that shown in FIG. 1.

In the embodiment shown, it is assumed that a training optical signal 610 can be received that includes alternating values according to any of the embodiments herein. In some embodiments, training optical signal 610 can regularly alternate between different data states. A rate of these alternating data states can be a data rate for a signal carried by training optical signal 610. In addition or alternatively, such a rate can be a multiple of a data clock rate. In some embodiments, modified optical signal 610 can be, or can be generated from, any of: a "preamble" of a data packet; a clock signal; or a clock recovery signal.

Optical modulator 602 can selectively remove/reduce/alter a characteristic of training optical signal 610 according to the format of the optical signal as understood from embodiments herein, and their equivalents. For example, optical modulator 602 can take the form 102, 302, 402, or 502 of FIGS. 1 3, 4 and 5. Optical signal detector 606 can distinguish variations of an output signal 614 from optical modulator 602 according to the type of modulation performed. For example, optical signal detector 606 can take the form 106, 306, 406, or 506 of FIGS. 1 3, 4 and 5.

A system 600 can include a clock circuit 638 and a driver 640. A clock circuit 638 can generate a timing signal CLK from an output of optical signal detector 606. Driver 640 can drive optical modulator 602 according to an output from clock circuit 638 or compare data according to a mode signal MODE. In the embodiment shown, a MUX 641 can control whether a signal CLK or compare data are inputs to driver 640. A clock circuit 638 can include a clock generation portion 638-0 and a clock adjust portion 638-1. A clock generation portion 638-0 can generate a periodic signal CLK as an output. A clock adjust portion 638-1 can selectively adjust a phase or frequency of signal CLK in response to input values. In a pattern detect or match mode, match pattern driver 640 can drive optical modulator 602 according to compare data pattern values. In some embodiments, compare data can be serially clocked into driver 640 by shift registers driven according to signal CLK.

In a synchronization mode, driver 640 can drive optical modulator 602 according to timing signal CLK. Accordingly, in a synchronization mode, modulator output signal 614 can represent how closely timing signal CLK matches a data rate of training optical signal 610.

FIG. 6B is a block diagram of a timing circuit 638-B according to an embodiment. A timing circuit 638-B can be a phase lock loop (PLL) type circuit, but any suitable adjustable timing circuit can be used. Timing circuit 638-B can include a phase/frequency detector (PD) 644, control MUX 646, voltage controlled oscillator (VCO) 648 and feedback loop 652. A PD can determine a difference between a match result and a signal from feedback loop 652. Control MUX 646 can allow an output of PD 644 or a lock value 650 to be applied to VCO 648. Application of lock value 650 to VCO 652 can result in CLK being maintained at a constant frequency. In some embodiments, timing circuit 638-B can include a frequency divider 643 at an input and/or a frequency multiplier 645 at an output. In addition, feedback loop 652 can include a frequency divider or multiplier.

FIG. 6C is a timing diagram showing a synchronization operation according to an embodiment. FIG. 6C includes the following waveforms: DATA can be data encoded in a first optical signal by the presence or absence of optical signal feature L1 at a certain frequency. While FIG. 6C shows alternating L1 and "0" (e.g., not L1) values, such signal can have a slower period (e.g., L1 values separated by more than one "0" value or vice versa). MOD shows the particular modulation executed by the optical modulator. As shown, optical modulator can reduce/eliminate L1 (represented by !L1) from DATA IN based on a period of signal CLK. DATA OUT shows an optical output from optical modulator following the noted modulation scheme. MATCH RESULT shows an output signal generated by an optical signal detector (e.g., 606) in response to an output from optical modulator.

In the embodiment shown, initially a CLK signal may be slower than the data rate of training signal 610. By operation of clock circuit (e.g., 638) the frequency can be increased (based on MATCH RESULT) until it matches training signal 610. At this point, a CLK signal can be locked at the frequency.

In some embodiments, match indications can be generated in a cumulative bit fashion, by logically combining a series of match results as they are generated, or on an individual bit fashion, with each match result being stored for output. A cumulative bit fashion can function in a manner like a parity check result. If one or more bit match results indicates a mismatch, the match result can have one value (e.g., "0"). Conversely, if all bit match results indicate a match, the match results can have a different value (e.g., "1").

Figure 7B:
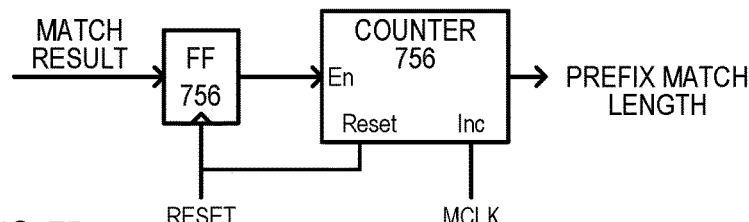
Figure 7C:
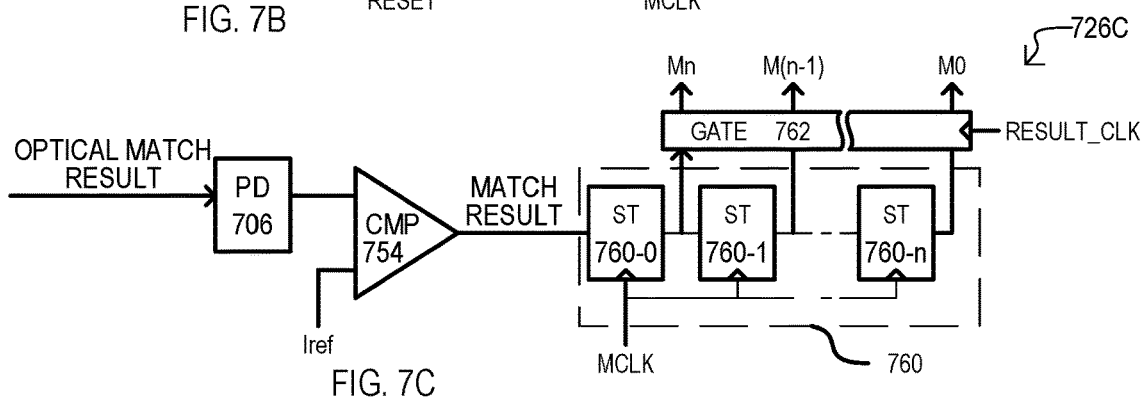

FIG. 7A to 7C are block diagrams of match result logic circuits that can be included in embodiments. It is understood that such circuits are provided by way of example and should not be construed as limiting.

FIG. 7A shows an example of match circuits 726A and a corresponding timing diagram according to an embodiment. Match circuits 726A can include a photodetector (PD) (or equivalent) 706, a comparator 754, a flip-flop (FF) (or equivalent) 756, and logic 758. PD 706 can generate an electrical signal from an optical match result. Comparator 754 can determine a logic value of the optical match result by comparing a PD generated current to a reference current Iref to generate an output signal MATCH RESULT. A FF 756 can capture a state of a stream of consecutive MATCH RESULT values, and then output the accumulated value in response to a signal RESULT_CLK. A signal MCLK can be the rate at which match results are received at FF 756.

Timing diagram 758 shows an example operation for match circuits 726A.

At time t0 a first bit set can be evaluated which can generate match results. While bit values remain "1", a FF can retain one logic state (logic high). However, at time t1,
a match value is indicated as "0" (e.g., no match between a modified optical data value and a compare value. As a result a FF can change logic states (transition to logic low). In the embodiment shown, evaluations are made for groups of eight bits. Thus, at time t2 (end of bit set 1), a FF state can be output (low), indicating an eight bit compare value did not match a modified optical data value.

At time t2 a next bit set can be evaluated which can generate results. In this case, the eight bit compare data value does match the modified optical data values. As a result, all match bit values are "1" and the FF maintains the high logic state. At time t3 (end of bit set 2), the FF state can be output (high), indicating an eight bit compare value match with a modified optical data value. Of course, greater or fewer number of bits can be compared, and the eight-bit operation shown is provided by way of example.

FIG. 7B shows a match result can be used to generate a prefix match length value. A match result can be input to a FF 756. While the match result indicates a match, a counter circuit 756 can be enabled. The counter circuit 756 can increment a count value according to clock MCLK, which can indicate the rate of match result data. Both the FF 756 and counter circuit 756 can be reset by a reset signal.

FIG. 7C shows another example of match circuits 726C. Unlike FIG. 7A, match circuits 726C can output an indication of match results for each bit evaluated. As in the case of FIG. 7A, PD 706 can generate an electrical signal from an optical match result from which comparator 754 can generate a logic value. Within serial-to-parallel circuit 760, n+1 match results can be clocked into stages 760-0 to -n, and then output in parallel in response to a RESULT_CLK, as parallel match result values M0 to Mn.

Figure 8:
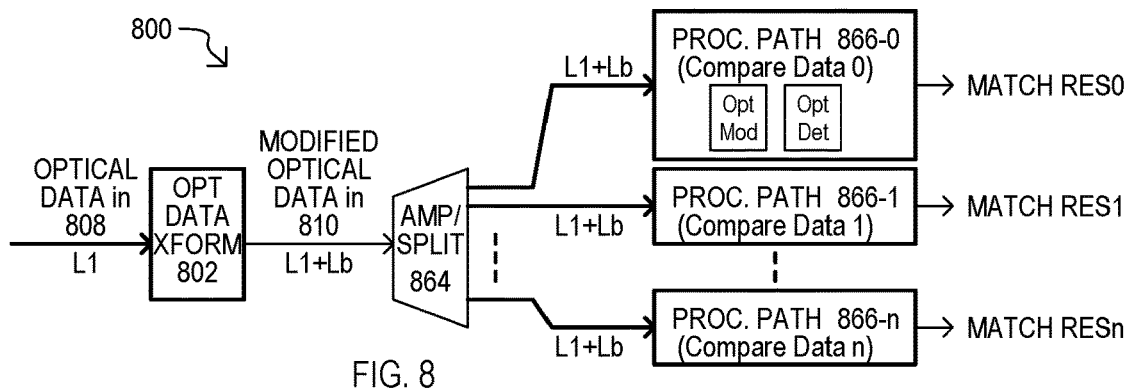
FIG. 8 is a block diagram of a system having multiple optical processing paths according to an embodiment.

While embodiments have shown systems with one optical signal processing path, other embodiments can include multiple optical signal processing paths. FIG. 8 shows a system 800 in which a same optical data signal can be processed with multiple optical signal processing paths. A system 800 can include an optical encoder 802, a splitter 864, and a number of processing paths 866-0 to -n. An optical encoder 802 can encode an optical signal as described herein and equivalents. In the embodiment shown, an input optical data signal 808 can be encoded into light pulses of light L1. An optical encoder 802 can add a different light Lb to the optical input signal to create a modified optical signal 810. Such an action can include those shown in the embodiments herein and equivalents.

Splitter 864, which can optionally include an amplifier, can provide the modified optical signal to each of the processing paths 866-0 to -n. Processing paths (866-0 to -n) can include any of those shown herein or equivalents. Each processing path (866-0 to -n) can include an optical modulator which can modulate the modified optical signal according to compare data value. An optical detector can detect a resulting optical signal which can be an optical compare result. In the embodiment shown, each processing path (866-0 to -n) can compare modified optical signal to a different compare data value (Compare data 0 to n).

Figure 9:
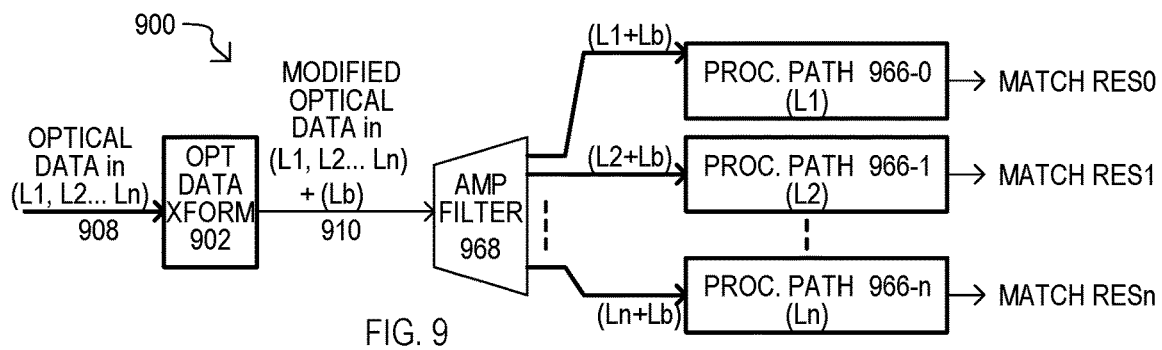
FIG. 9 is a block diagram of a system having multiple processing paths according to another embodiment.

FIG. 9 shows a system 900 in which an optical data signal having multiplexed optical signals can be processed with multiple optical signal processing paths. A system 900 can include an optical encoder 902, a filter section 964, and a number of processing paths 966-0 to -n. An optical encoder 902 can encode an optical signal as described herein and equivalents. In the embodiment shown, an input optical data signal 908 can be encoded into light pulses of different wave lengths L1 to Ln. An optical encoder 902 can add one or more different lights Lb to each of the optical input signal to create a modified optical signal 910. Such an action can include those shown in the embodiments herein and equivalents.

Filter 964, which can optionally include an amplifier, can filter the modified optical signal so that a different wavelength (e.g., L1 or L2 etc.) and the added light (Lb) is provided to each processing paths 966-0 to -n. Processing paths (966-0 to -n) can include any of those shown herein or equivalents. Each processing path (966-0 to -n) can include an optical modulator and an optical detector. As described herein, or an equivalent. Thus, match results (MATCH RES0 to n) can represent a pattern match with one particular wavelength of input optical signal 908.

Figure 10:
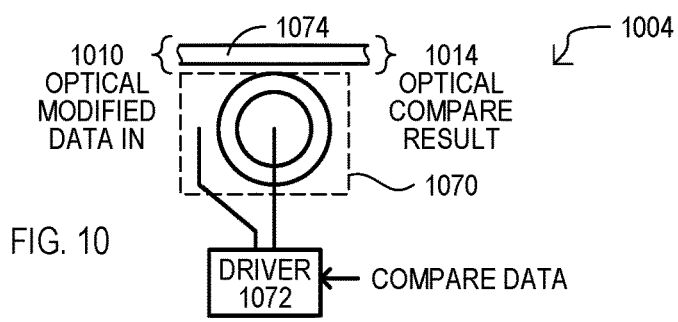
FIG. 10 is a diagram of a modulator having a microring resonator according to an embodiment.

Embodiments herein can modulate a modified optical signal using any suitable modulator type. In some embodiments, a microring resonator can be used to modulate an optical signal. FIG. 10 is a diagram of an optical modulator 1004 according to an embodiment. A modified optical signal 1010 can be received on an optical path (e.g., waveguide) 1074. A driver circuit 1072 can provide a varying bias voltage to a microring resonator 1070 based on a COMPARE DATA value. As a result, microring resonator 1070 can selectively filter a frequency of light within modified optical signal 1010 according to compare data. The resulting modulation can create optical match signal 1014, which can continue to propagate down optical path 1074.

Figure 11:
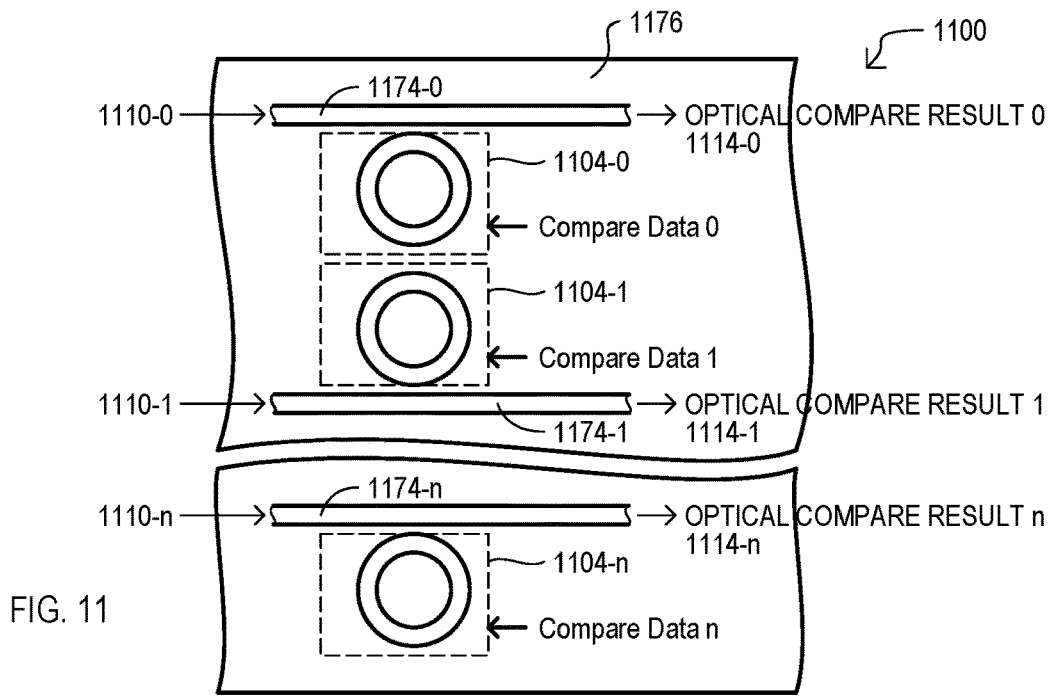
FIG. 11 is a diagram of a device having multiple microring resonators according to an embodiment.

FIG. 11 is a diagram of an integrated circuit 1100 device that can process multiple optical signals in parallel. Modified optical input signal(s) 1110-0 to -n can be generated according to embodiments described herein and equivalents. Modified optical input signals (1110-0 to -n) can be input on corresponding optical paths 1174-0 to -n. It is noted that any or all of modified optical input signals (1110-0 to -n) can be the same (e.g., via splitter) or different (e.g., different encoded data values, different wavelengths, etc.).

A microring resonator 1104-0 can modulate each modified optical input signal 1110-0 to -n according to a compare data value (Compare Data 0 to n). Compare data values (Compare Data 0 to n) can be different or can be the same according to application. The modulation operation of microring resonators (1104-0 to -n) can generate optical compare results 1114-0 to -n, which can indicate how an optical input signal (from which the modified optical input signals 1110-0 to -n are generated) matches the corresponding compare data value (Compare Data 0 to n).

The various processing paths can all be formed in a same integrated circuit substrate 1176 for an advantageously compact device. Such an integrated circuit can include the driver circuits for controlling the microring resonators (1104-0 to -n) as well as logic circuits for processing data encoded in the optical input signals.

Figure 12:
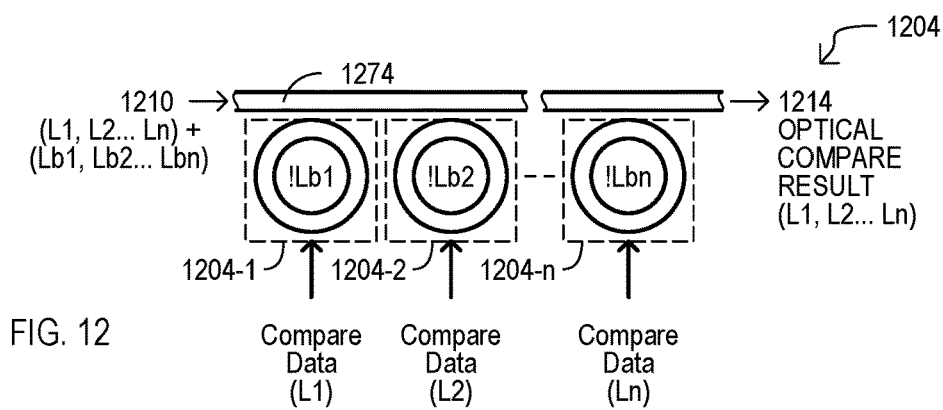
FIG. 12 is a diagram of a device having multiple microring resonators according to an embodiment.

FIG. 12 is a diagram showing a modulator 1204 for modulating a wavelength multiplexed signal according to an embodiment. A modified optical signal 1210 can be received on an optical path 1274. Such a modified optical signal 1210 can include multiple optical signals, each including light of a different wavelength (shown as L1 to Ln in this example). In addition, the signal can include added light Lb1 to Lbn. Microring resonators 1204-1 to -n can modulate the modified optical input signal 1210 to substantially remove a particular added light (Lb1 to Lbn). The resulting modulation can create a multiplexed optical match signal 1214, which can continue to propagate down optical path 1274. A filter can selectively filter the different frequency components of the optical match signal 1214 to enable separate detection of match conditions for each (e.g., each different frequency can be provided its own photodetector).

Figure 13:
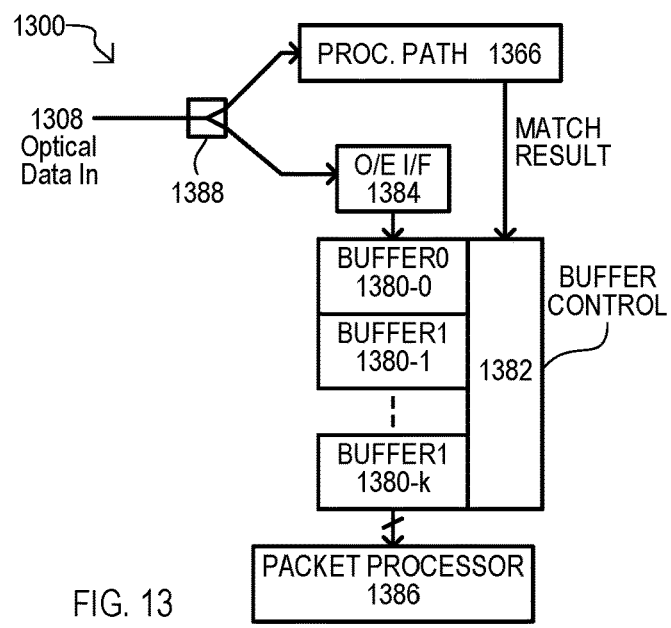
FIG. 13 is a block diagram of another system according to an embodiment.

Embodiments can include systems where optical packets are buffered and rapidly analyzed using a processing path as described herein, or an equivalent. FIG. 13 is a block diagram of an exemplary system.

A system 1300 can include a splitter 1388, an optical processing path(s) 1366, an optical/electrical interface (O/E I/F) 1384, buffers 1380-0 to -k, a buffer control 1382, and a packet processor section 1386. In the embodiment of FIG. 1300 it is assumed optical input signal 1308 transmits data in organized frames or packets.

By operation of splitter 1388, an optical signal 1308 can be applied to both processing path 1366 and O/E I/F 1384. An optical processing path 1366 can take the form of any of those described herein, or an equivalent. As but one example, processing path 1366 can add a light frequency to optical signal 1308 to create a modified optical signal which can be modulated according to compare data.

While optical signal processing is taking place in processing path 1366, the optical signal can be received at O/E I/F 1384. By operation of O/E I/F 1384, a packet can begin to be buffered in an assigned buffer (1380-0 to -k).

Optical processing path 1366 can generate a match result which can be applied to buffer control circuit 1362. A match result can include a match result for one or for multiple compare data values. Based on such a match result(s), buffer control circuit 1382 can execute various operations for disposing of the packet (which may still be in the process of being buffered). As but one example, a buffer control circuit 1382 can ignore the packet (freeing its buffer) in the event there is not match result with any compare data value. In addition or alternatively, a buffer control circuit 1382 can designate the incoming packet for processing by packet processor 1386.

Figure 14:
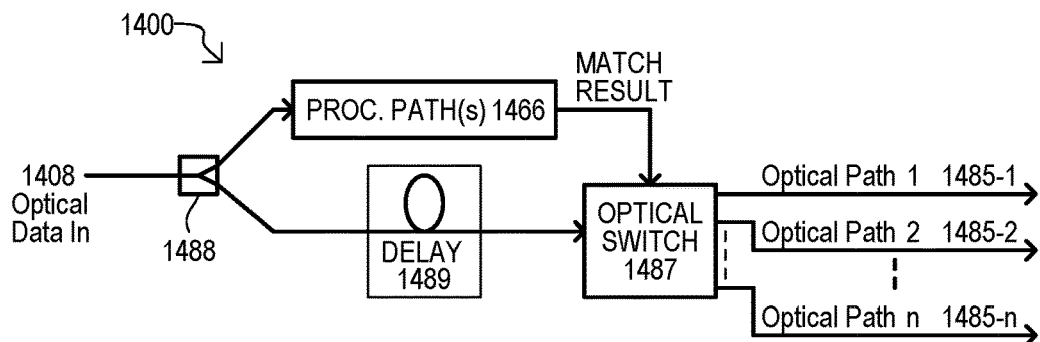
FIG. 14 is a block diagram of a further system according to an embodiment.

Embodiments can include systems where optical packets are switched along different network routes based on rapid optical analysis of packet data (e.g., header data). An example of such a system is shown in FIG. 14.

A system 1400 can include a splitter 1488, an optical processing path(s) 1466, a delay section 1489, and an optical switch 1487. By operation of splitter 1488, an optical signal 1408 can be applied to both processing path 1366 and optical switch 1487 via delay section 1487. An optical processing path 1366 can take the form of any of those described herein, or an equivalent. While optical signal processing is taking place in processing path 1466, the optical signal can be delayed by delay section 1489.

Optical processing path 1466 can generate one or more match results which can be applied to optical switch 1487. A based on such a match result(s), optical switch 1487 can allow the optical signal to propagate down one or more selected optical paths 1485-1 to -n. An optical switch 1487 can include amplifiers (e.g., repeaters).

While the various embodiments described have shown devices and systems and their corresponding methods, additional methods will now be described.

Figure 15:
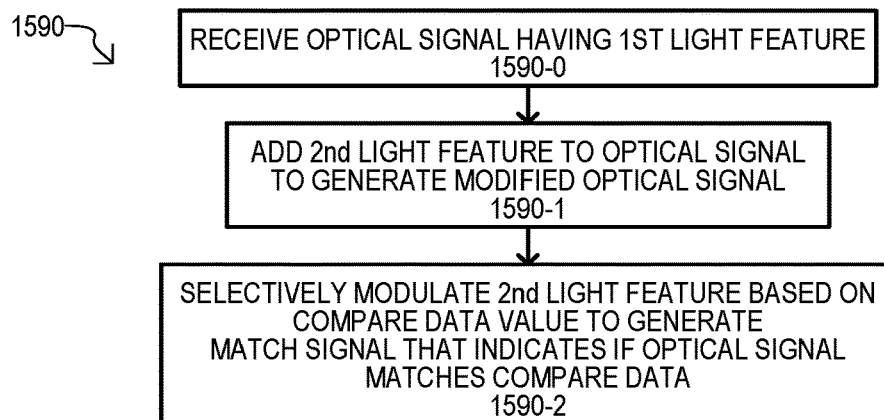
FIG. 15 is a block diagram of a method according to an embodiment.

FIG. 15 is a flow diagram of a method 1590 according to an embodiment. A method 1590 can include receiving an optical signal having a first light feature 1590-0. Such an action can include receive a light signal encoded to vary a light feature based on a data value. A light feature can include any of those described herein or equivalents. A second light feature can be added to the optical signal to generate a modified optical signal 1590-1. Such an action can include adding the additional feature to all data values of the optical signal or adding such a feature to only certain parts of the optical signal (e.g., where there is an absence of the first feature.

A method 1590 can include selectively modulating the 2nd light feature based on a compare data value. This can generate a match signal which can indicate if data encoded in the input optical signal match that of the compare data value 1590-2.

Figure 16:
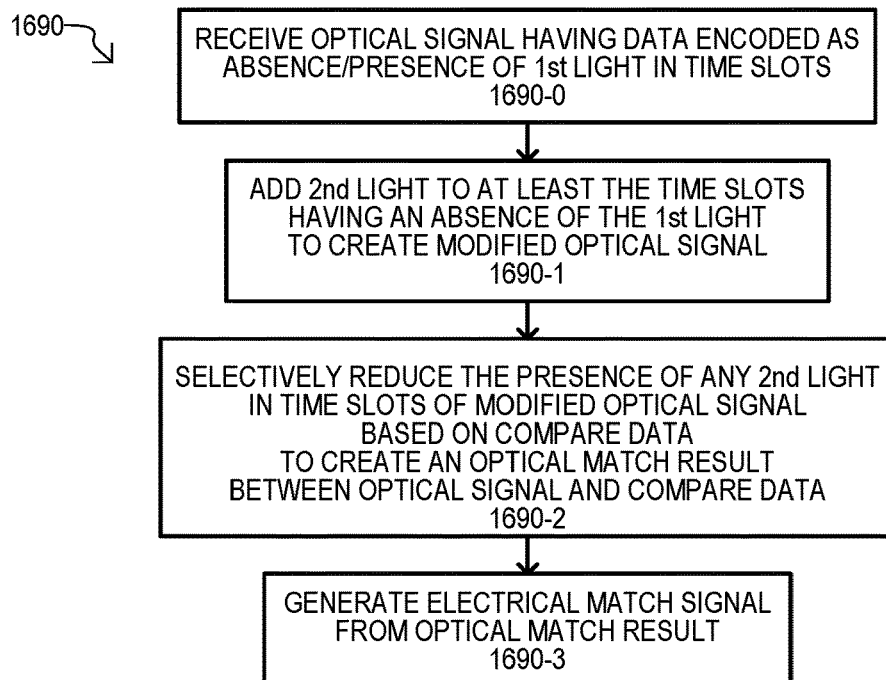
FIG. 16 is a block diagram of a method according to another embodiment.

FIG. 16 is a flow diagram of a method 1690 according to another embodiment. A method 1690 can include receiving an optical signal having data encoded as the absence or presence of a first type light in time slots 1690-0. A method 1690 can include adding a second type light to at least the time slots having the absence of the first type light to create a modified optical signal 1690-1. The presence of any second type light in the modified optical signal can be selectively reduced based on a compare data value. This can create an optical match result between the data encoded in the optical signal and the compare data value 1690-2. An electrical signal can be generated from the optical match result 1690-3.

FIGS. 17A to 17CE are diagrams showing a system 1700 according to another particular embodiment. A system 1700 can include items like those shown in FIG. 1, and such like items are referred to by the same reference character, but with the leading digit being a "3" instead of a "1".

In the embodiment shown, modulator 1704 can receive a data value from a first optical signal 1708. In this embodiment, such a first optical signal 1708 is not modulated. Optical signal detector section 1714 can generate and output signal IPD. In some embodiments such a signal can be a current. Modulator 1792 can modulate IPD according to match data 1712 (which can be encoded by encoder 1740). In some embodiments, modulator 1792 can be a current source which can add current based on a match data value. A resulting modulated signal IPDmod can be received at a level sense circuit 1794. A level sense circuit 1794 can generate a match result by comparing IPDmod to at least two different threshold levels.

FIG. 17B is a diagram showing an operation of level sense circuit 1794. If a value of IPDmod is below one threshold Th0 and above another Th1, a first type match result can be generated (in this case MATCH). If a value of IPDmod is between thresholds Th0 and Th1, a second type match result can be generated (in this case NO MATCH).

FIG. 17C is a timing diagram showing an operation for a system like that of FIG. 17A, according to an embodiment. FIG. 17C includes the following waveforms: DATA can be data encoded in a first optical signal by the presence or absence of optical signal feature. Compare can be a modulating input value received by a modulator. IPD(conv) shows an output of optical detect section generated from DATA. Icomp shows an additive value (with respect to IPD(conv)) generated in response to Compare data. IPDmod shows a resulting value input to a level detect circuit. Levels for thresolds Th0 and Th1 are shown on IPDmod. MATCH RESULT shows an output signal generated by a level detect circuit. As shown, when Compare does not match DATA, MATCH RESULT has one value (in this case N), and when Compare Code matches DATA, MATCH RESULT has another value (Y).

FIGS. 18A and 18B are diagrams of an optical multiplexer (MUX) 1896 according to an embodiment. MUX 1896 can include a system section 1800, a first microring resonator 1804-0 and a second microring resonator 1804-1. MUX 1896 can be configured to receive an optical signal at an input (IN) and generate a corresponding optical signal at one of two outputs (OUT1, OUT2). A system 1800 can include a processing path according to any of the embodiments herein. In some embodiments, microring resonator 1804-0 can serve as a modulator for the system.

FIG. 18A shows a configuration operation for MUX 1896 according to an embodiment. MUX 1896 can receive configuration data, which in some embodiments can be a burst header packet (BHP). Bits within BHP can be compared to match data according to any of the embodiments disclosed herein. In some embodiments, this can include driving microring resonator 1812 with compare data and previously adding an addition light features to the input signal as described herein.

FIG. 18B shows a switching operation for MUX 1896 according to an embodiment. In response to a match result generated in a configuration operation, MUX 1896 can generate control values (ADD/DROP) to configure microring resonators 1804-0/1 to generate an output optical signal on output OUT1 or OUT2 corresponding to optical input signal received on IN. In some embodiments, MUX 1896 can output a burst data packet (BDP) 1899 on OUT1 or OUT2. The BDP 1899 can correspond to a BHP 1898 received previously.

It should be appreciated that in the foregoing description of exemplary embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. It is also understood that the embodiments of the invention may be practiced in the absence of an element and/or step not specifically disclosed. That is, an inventive feature of the invention can be elimination of an element.

It is also understood that other embodiments of this invention may be practiced in the absence of an element/step not specifically disclosed herein.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A system, comprising:
a first optical source coupled to at least one optical medium that generates a first optical signal comprising light in a first frequency range that varies in response to first data;
a second optical source coupled to the at least one optical medium that generates light of a second frequency range that does not vary in response to the first data, wherein the first and second frequency ranges do not overlap;
at least one optical modulator that optically modulates the first optical signal and the light of the second frequency range according to compare data to generate an optical match signal that indicates matches between the compare data and the first data; and
at least one photodetector that generates an electrical match signal in response to the optical match signal; wherein
the optical match signal has
at least first values when the first data matches the compare data, and
at least second values when the first data does not match the compare data.

2. The system of claim 1, wherein:
the first optical source generates the first optical signal comprising time periods that include light of the first frequency range and the absence of light of the first frequency range according to the first data; and
the second optical source generates the light of the second frequency range in the time periods.

3. The system of claim 1, wherein the at least one optical medium comprises a fiber optic medium.

4. The system of claim 1, wherein:
the at least one optical modulator includes
a first optical modulator that modulates the first optical signal according to the compare data, and
a second optical modulator that modulates the light of the second frequency range according to the compare data.

5. The system of claim 4, wherein the first and second optical modulators comprise microring resonators.

6. The system of claim 4, wherein:
the at least one optical medium includes
a first optical path coupled to the first optical modulator, and
a second optical path coupled to the second optical modulator.

7. The system of claim 4, wherein the first optical modulator and second optical modulator are coupled to the at least one optical medium in series.

8. The system of claim 1, wherein
a third optical source coupled to the at least one optical medium that generates a second optical signal comprising light in a third frequency range that varies in response to second data, and
a fourth optical source coupled to the at least one optical medium that generates light of a fourth frequency range that does not vary in response to the second data, wherein the first, second, third and fourth frequency ranges do not overlap one another;
the at least one optical modulator further modulates the second optical signal and the light of the fourth frequency range according to second compare data to generate a second optical match signal that indicates matches between the second compare data and the second data; and
the at least one photodetector generates a second electrical match signal in response to the second optical match signal.

9. The system of claim 1, further including:
the at least one photodetector includes
a first photodetector that detects light of the first frequency range, and
a second photodetector that detects light of the second frequency range; and
logic circuits configured to logically combine output signals from at least the first and second photodetectors.

10. The system of claim 1, wherein the at least one optical medium, the at least one optical modulator and the at least one photodetector are formed on a same circuit substrate.

11. A method, comprising:
by operation of at least one optical medium, providing
a first optical signal comprising light in a first frequency range that varies in response to first data, and
light of a second frequency range that does not vary in response to the first data, wherein the first and second frequency ranges do not overlap;
modulating the first optical signal and the light of the second frequency with at least one optical modulator according to compare data to generate an optical match signal that indicates matches between the compare data and the first data; and
generating an electrical match signal with at least one photodetector in response to the optical match signal; wherein
the optical match signal has
at least first values when the first data matches the compare data, and
at least second values when the first data does not match the compare data.

12. The method of claim 11, wherein:
the first optical signal comprises time periods that include light of the first frequency range and the absence of light of the first frequency range according to the first data; and
the second optical signal includes light of the second frequency range in the time periods.

13. The method of claim 11, wherein the at least one optical medium comprises a fiber optic medium.

14. The method of claim 11, wherein:
modulating the first optical signal and the light of the second frequency includes
by operation of a first optical modulator, modulating the first optical signal according to the compare data, and
by operation of a second optical modulator, modulating the light of the second frequency range according to the compare data.

15. The method of claim 14, wherein:
the first optical signal is modulated with at least a first microring resonator, and
the light of the second frequency range is modulated with at least a second microring resonator.

16. The method of claim 14, wherein:
modulating the first optical signal includes modulating a first optical path, and
modulating the light of the second frequency range includes modulating a second optical path that is different than the first optical path.

17. The method of claim 14, wherein:
modulating the first optical signal includes modulating an optical path with the first optical modulator, and
modulating the light of the second frequency range includes modulating the optical path with the second optical modulator.

18. The method of claim 14, wherein:
generating the electrical match signal includes
detecting light in the first frequency range with a first photo detector to generate a first detect signal, detecting light in the second frequency range with a second photo detector to generate a second detect signal, and logically combining the first and second detect signals to generate the optical match signal.

19. The method of claim 11, wherein:

by operation of the at least one optical medium, providing
- a second optical signal comprising light in a third frequency range that varies in response to second data, and
- light of a fourth frequency range that does not vary in response to the second data, wherein the first, second, third and fourth frequency ranges do not overlap;

modulating the second optical signal and the light of the fourth frequency range with at least one optical modulator according to compare data to generate a second optical match signal that indicates matches between the compare data and the second data.

\* \* \* \* \*